United States Patent
Shimada

(10) Patent No.: US 7,346,693 B2
(45) Date of Patent: Mar. 18, 2008

(54) LOAD BALANCING SERVER TO DETERMINE OPTIMUM VALUE OF NUMBER OF PERMANENT CONNECTIONS WITH SERVER

(75) Inventor: Yuusuke Shimada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 928 days.

(21) Appl. No.: 10/730,675

(22) Filed: Dec. 8, 2003

(65) Prior Publication Data

US 2004/0133691 A1 Jul. 8, 2004

(30) Foreign Application Priority Data

Dec. 10, 2002 (JP) .............................. 2002-358154

(51) Int. Cl.
*G06F 15/16* (2006.01)
*G06F 15/173* (2006.01)
*G06F 15/177* (2006.01)

(52) U.S. Cl. .................... 709/228; 718/105; 709/226; 709/224

(58) Field of Classification Search ........ 709/217–230; 718/105, 106
See application file for complete search history.

(56) References Cited

U.S. PATENT DOCUMENTS

| | | | | |
|---|---|---|---|---|
| 6,115,382 | A * | 9/2000 | Abe .................. | 370/395.3 |
| 6,473,802 | B2 * | 10/2002 | Masters .............. | 709/229 |
| 7,047,301 | B2 * | 5/2006 | Skene et al. ........ | 709/226 |
| 7,099,915 | B1 * | 8/2006 | Tenereillo et al. .... | 709/203 |
| 7,139,828 | B2 * | 11/2006 | Alkhatib et al. ..... | 709/230 |
| 7,287,082 | B1 * | 10/2007 | O'Toole, Jr. ........ | 709/228 |
| 7,287,084 | B1 * | 10/2007 | Masters .............. | 709/229 |
| 2001/0034792 | A1 * | 10/2001 | Swildens ............ | 709/238 |
| 2002/0059170 | A1 * | 5/2002 | Vange ............... | 707/1 |
| 2002/0161890 | A1 * | 10/2002 | Chen ................ | 709/226 |
| 2002/0194505 | A1 * | 12/2002 | Muschenborn ........ | 713/201 |
| 2003/0115317 | A1 * | 6/2003 | Hickson et al. ...... | 709/224 |
| 2003/0204602 | A1 * | 10/2003 | Hudson et al. ....... | 709/228 |
| 2004/0044778 | A1 * | 3/2004 | Alkhatib et al. ..... | 709/228 |
| 2004/0243486 | A1 * | 12/2004 | Butler et al. ........ | 705/28 |
| 2005/0228884 | A1 * | 10/2005 | Hawley .............. | 709/225 |
| 2006/0059253 | A1 * | 3/2006 | Goodman et al. ..... | 709/223 |

FOREIGN PATENT DOCUMENTS

JP 2002-335268 11/2002

OTHER PUBLICATIONS

"Technique for Improving Performance of Web Application"; JavaWorld; pp. 085-095; Nov. 2002.
"IBM Autonomic Computing"; Nikkei Internet Solutions; pp. 64-66; Dec. 2002.
"Ethernet Switch at Unit Price of Port Less than ¥50,000"; Nikkei Communications; pp. 40-41; 1995.
Manual of Operation for IPCOM 100, P3NK-E332-02; p. 52; Fujitsu Ltd; May 2002.

* cited by examiner

*Primary Examiner*—Haresh Patel
(74) *Attorney, Agent, or Firm*—Greer, Burns & Crain, Ltd.

(57) ABSTRACT

A server-load-balancing program for establishing a permanent connection to a server in advance, and requesting the server to execute a processing request received from a client, by using the permanent connection. First, history information indicating conditions of use of at least one permanent connection in each of first time intervals into which each of at least one preceding period is divided is stored. Next, an optimum value of the number of at least one permanent connection to be established in each of second time intervals into which a coming period is divided is determined based on the history information. Then, the at least one permanent connection to the server in each of the second time intervals in the coming period is established so that the number of the at least one permanent connection in each of the second time intervals is equal to the optimum value.

8 Claims, 12 Drawing Sheets

141 PERMANENT-CONNECTION-NUMBER HISTORY TABLE

| TIME INTERVAL | NECESSARY NUMBERS OF PERMANENT CONNECTIONS | | | | OPTIMUM NUMBER OF PERMANENT CONNECTIONS |
|---|---|---|---|---|---|
| | 1 | 2 | ... | m | |
| $T_1$ | M1[1] | M1[2] | ... | M1[m] | $P_1$ |
| $T_2$ | M2[1] | M2[2] | ... | M2[m] | $P_2$ |
| ⋮ | ⋮ | ⋮ | ⋮ | ⋮ | ⋮ |
| $T_n$ | Mn[1] | Mn[2] | ... | Mn[m] | $P_n$ |

FIG. 5

141 PERMANENT-CONNECTION-NUMBER HISTORY TABLE

| TIME INTERVAL (T) | NECESSARY NUMBERS OF PERMANENT CONNECTIONS | | | | | | | OPTIMUM NUMBER OF PERMANENT CONNECTIONS |
|---|---|---|---|---|---|---|---|---|
| | 1 | 2 | 3 | 4 | 5 | 6 | 7 | |
| 0~1 | 10 | 9 | 13 | 9 | 8 | 14 | 7 | 10 |
| 1~2 | 11 | 8 | 6 | 11 | 7 | 14 | 6 | 9 |
| ... | ... | ... | ... | ... | ... | ... | ... | ... |
| 23~24 | 14 | 24 | 15 | 16 | 21 | 19 | 17 | 18 |

FIG. 10

141 PERMANENT-CONNECTION-NUMBER HISTORY TABLE

| TIME INTERVAL (T) | NECESSARY NUMBERS OF PERMANENT CONNECTIONS | | | | | | | OPTIMUM NUMBER OF PERMANENT CONNECTIONS |
|---|---|---|---|---|---|---|---|---|
| | 1 | 2 | 3 | 4 | 5 | 6 | 7 | |
| 0~1 | 12 | 10 | 9 | 13 | 9 | 8 | 14 | 11 |
| 1~2 | 11 | 8 | 6 | 11 | 7 | 14 | 6 | 9 |
| ... | ... | ... | ... | ... | ... | ... | ... | ... |
| 23~24 | 14 | 24 | 15 | 16 | 21 | 19 | 17 | 18 |

FIG. 12

LOAD BALANCING SERVER TO DETERMINE OPTIMUM VALUE OF NUMBER OF PERMANENT CONNECTIONS WITH SERVER

CROSS-REFERENCE TO RELATED APPLICATIONS

This application claims the priority of Japan Application No. 2002-358154 Dec. 10, 2002, under 35 U.S.C. 119.

BACKGROUND OF THE INVENTION

1) Field of the Invention

The present invention relates to a server-load-balancing program, a server-load-balancing method, and a server-load-balancing apparatus which distribute over a plurality of servers a plurality of processing requests sent from clients so that the plurality of processing requests are processed by the plurality of servers in a distributed manner. In particular, the present invention relates to a server-load-balancing program, a server-load-balancing method, and a server-load-balancing apparatus which establish permanent connections with servers.

2) Description of the Related Art

In the case where a service is provided through a large-scale network such as the Internet, the service is provided by using a plurality of servers. At this time, it is desirable that processing requests from clients are processed in a distributed manner so that loads imposed on the respective servers are balanced. For this purpose, server-load balancing apparatuses which distribute among servers processing requests sent from clients are provided.

For example, each server-load-balancing apparatus is arranged between the Internet and a plurality of servers. Each processing request sent from a client which is connected to the Internet is first inputted into the server-load-balancing apparatus. The server-load-balancing apparatus monitors the load status of each server, and sends the processing request to one of the servers which has a function of executing the processing request and the load state of which allows execution of the processing request. Thus, it is possible to balance the loads imposed on the plurality of servers, and concurrently provide a service to a number of users with little delay.

The above server-load-balancing apparatus transmits the processing request to the server, and receives a response indicating a processing result from the server through a connection established on a network (a path logically established for communication). Normally, in communication using a connection, the connection is established at the beginning of the communication, and disconnected at the end of the communication.

However, in a construction in which each processing request to be transferred from a client to a server necessarily passes through a server-load-balancing apparatus, a response to each processing request is required to be prompt. In this case, the promptness of responses can be enhanced by establishing in advance connections between the server and the server-load-balancing apparatus.

That is, in the case where connections are preestablished, it is unnecessary to execute processing for establishing a connection at the time of transmission of a processing request. Therefore, it is possible to promptly distribute among servers processing requests received from clients. Hereinafter, connections preestablished as above are called permanent connections.

The number of permanent connections preestablished for each server is defined in advance in each server-load-balancing apparatus. When the service is started, each server-load-balancing apparatus establishes permanent connections corresponding to the predefined number. Thereafter, the established permanent connections are maintained during operation of the system. Therefore, the server-load-balancing apparatus can send each processing request to a server to which the processing request is to be distributed, immediately after the server is determined (without execution of processing for establishing a connection).

As explained above, when permanent connections are preestablished, processing requests sent from clients can be promptly distributed among clients. The processing for establishing permanent connections has been already realized as a function of web acceleration (see, for example, the Manual of Operation for IPCOM 100, P3NK-E332-02, pp. 52, Fujitsu Ltd., May 2002).

However, according to the conventional techniques, it is difficult to appropriately set the number of permanent connections. That is, in practice, the appropriate number of permanent connections varies with operational conditions of the system. Therefore, when actual operational conditions are different from expected operational conditions, permanent connections become superfluous or insufficient.

In the case where the permanent connections are insufficient, even when the server-load-balancing apparatus receives a request from a client, none of permanent connections to a server to which the request is to be transmitted may be available. When no permanent connection to the server to which a request is to be transmitted is available, it is necessary to establish a new connection, or wait until at least one of the permanent connections becomes available. Therefore, when shortage of permanent connections frequently occurs, the promptness of responses to processing requests is reduced.

In addition, when the number of the permanent connections is too great, a great number of permanent connections are unused, and therefore resources such as memories in the server-load-balancing apparatus and each server are uselessly occupied.

SUMMARY OF THE INVENTION

The present invention is made in view of the above problems, and the object of the present invention is to provide a server-load-balancing program, a server-load-balancing method, and a server-load-balancing apparatus which can establish an appropriate number of one or more permanent connections corresponding to operational conditions.

In order to accomplish the above object, a server-load-balancing program which is executed by a computer and makes the computer perform a process is provided. The process establishes a permanent connection between the computer and a server in advance, and requests the server to execute a processing request received from a client, by using the permanent connection. The process comprises the steps of: (a) storing history information indicating conditions of use of at least one permanent connection in each of a plurality of first time intervals into which each of at least one preceding period is divided; (b) determining an optimum value of the number of at least one permanent connection to be established in each of a plurality of second time intervals into which a coming period is divided, based on the history information, where the plurality of second time intervals correspond to the plurality of first time intervals, respectively; and (c) establishing between the computer and the server the at least one permanent connection in each of the plurality of second time intervals in the coming period so that the number of the at least one permanent connection in each of the plurality of second time intervals is equal to the optimum value.

In addition, in order to accomplish the above object, a server-load-balancing method for establishing a permanent connection between a server-load-balancing apparatus and a server in advance, and requesting the server to execute a processing request received from a client, by using the permanent connection is provided. The server-load-balancing method comprises the steps of: (a) storing history information indicating conditions of use of at least one permanent connection in each of a plurality of first time intervals into which each of at least one preceding period is divided; (b) determining an optimum value of the number of at least one permanent connection to be established in each of a plurality of second time intervals into which a coming period is divided, based on the history information, where the plurality of second time intervals correspond to the plurality of first time intervals, respectively; and (c) establishing between the server-load-balancing apparatus and the server the at least one permanent connection in each of the plurality of second time intervals in the coming period so that the number of the at least one permanent connection in each of the plurality of second time intervals is equal to the optimum value.

Further, in order to accomplish the above object, a server-load-balancing apparatus for establishing a permanent connection to a server in advance, and requesting the server to execute a processing request received from a client, by using the permanent connection is provided. The server-load-balancing apparatus comprises: a history storing unit which stores history information indicating conditions of use of at least one permanent connection in each of a plurality of first time intervals into which each of at least one preceding period is divided; an optimum-number determination unit which determines an optimum value of the number of at least one permanent connection to be established in each of a plurality of second time intervals into which a coming period is divided, based on the history information, where the plurality of second time intervals correspond to the plurality of first time intervals, respectively; and a permanent-connection establishment unit which establishes between the server-load-balancing apparatus and the server the at least one permanent connection in each of the plurality of second time intervals so that the number of the at least one permanent connection in each of the plurality of second time intervals is equal to the optimum value.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

In the drawings:

FIG. 5 is a diagram illustrating an example of a data structure of each permanent-connection-number history table;

FIG. 10 is a diagram illustrating an example of information registered in one of the permanent-connection-number history tables;

FIG. 12 is a diagram illustrating an example of information registered in one of the permanent-connection-number history tables after an update.

DESCRIPTION OF THE PREFERRED EMBODIMENTS

An embodiment of the present invention is explained below with reference to drawings.

First, an outline of the present invention which is realized in the embodiment is explained, and thereafter details of the embodiment are explained.

Figure 1:
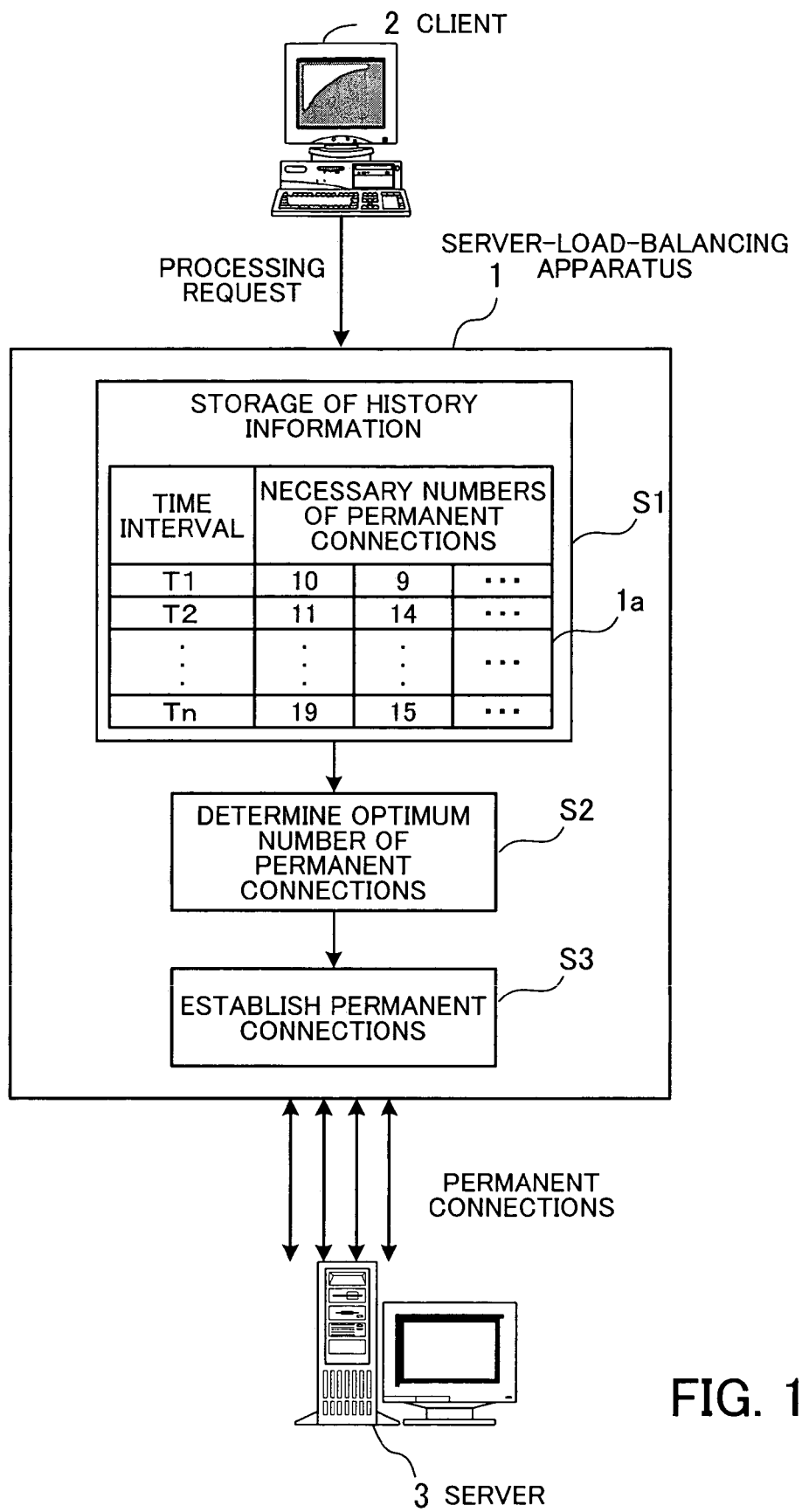
FIG. 1 is a conceptual diagram illustrating the present invention which is realized in an embodiment.

FIG. 1 is a conceptual diagram illustrating the present invention which is realized in the embodiment. In the present invention, a server-load-balancing apparatus 1 is realized by a computer which executes a server-load-balancing program. The server-load-balancing apparatus 1 performs the following processing.

First, the server-load-balancing apparatus 1 divides each period having a predetermined length into a plurality of time intervals, and stores history information 1a (in step S1). The history information 1a indicates conditions of use of one or more permanent connections in each time interval in each preceding period. For example, the predetermined length is a day, and each day is divided into 24 time intervals having identical lengths, so that the server-load-balancing apparatus 1 stores as the history information 1a the conditions of use of one or more permanent connections in each hour. The conditions of use of one or more permanent connections can be represented by, for example, the maximum value of the number of one or more permanent connections which have been required during each time interval (i.e., the maximum necessary number of one or more permanent connections). For example, the necessary number of one or more permanent connections to each server can be obtained by calculating a sum of the number of one or more permanent connections to the server which are used and the number of one or more processing requests each of which is waiting for an available permanent connection to the server.

Next, the server-load-balancing apparatus 1 determines an optimum value of the number (optimum number) of one or more permanent connections to each server in each time interval (in step S2). For example, the optimum number of one or more permanent connections in each time interval may be determined to be an average of the necessary numbers of one or more permanent connections in identical time intervals in a plurality of preceding periods.

Then, the server-load-balancing apparatus 1 establishes at least one permanent connection to each server in each time interval (in step S3), where the number of the at least one permanent connection is the optimum number determined for the time interval. In addition, in the case where permanent connections in a time interval the number of which is greater than the optimum number for the time interval are already established at the beginning of the time interval, at least one superfluous permanent connection is disconnected.

As explained above, the conditions of use of one or more permanent connections to each server is stored as the history information, and the optimum number of one or more permanent connections to each server in each time interval is determined based on the history information. Therefore, when the conditions of use of one or more permanent connections vary with variations in operational conditions, the optimum number of one or more permanent connections is changed accordingly. That is, the number of one or more established permanent connections is optimized according to the operational conditions.

In other words, according to the present invention, it is possible to recognize the load conditions of the network in each time interval based on the history information. In addition, it is possible to establish a greater number of permanent connections when the load increases, and a smaller number of permanent connections when the load decreases. Thus, necessary numbers of permanent connections can be predicted based on the history information, so that effective numbers of permanent connections can be established. Consequently, resources can be efficiently used by continually establishing optimum numbers of permanent connections, and therefore the system utilization efficiency can be increased.

Further, the numbers of permanent connections can be automatically calculated by the server-load-balancing apparatus 1. Therefore, the administrator of the server-load-balancing apparatus 1 is not required to set permanent connections, and thus the load imposed on the administrator can be reduced.

Hereinbelow, an embodiment of the present invention is explained in detail.

Figure 2:
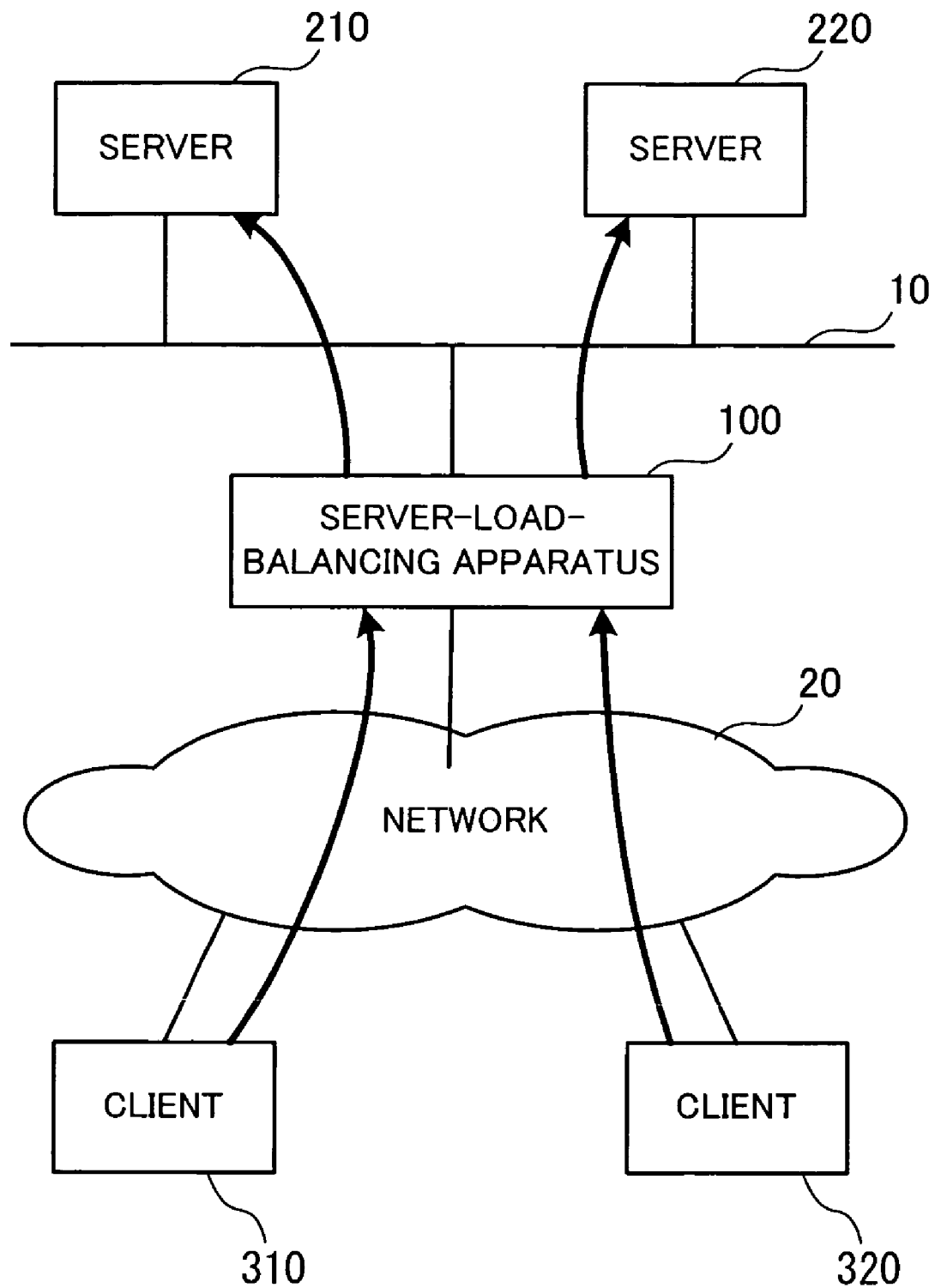
FIG. 2 is a diagram illustrating an exemplary construction of a system in an embodiment of the present invention.

FIG. 2 is a diagram illustrating an exemplary construction of a system in an embodiment of the present invention. In the present embodiment, a server-load-balancing apparatus 100 is connected to servers; 210 and 220 through a network 10, and to clients 310 and 320 through a network 20. The server-load-balancing apparatus 100 is a computer which monitors loads imposed on the servers 210 and 220, and distributes processing requests sent from the clients 310 and 320 to at least one server on each of which a light load is imposed. Processing requests determined to be distributed to the at least one server are transmitted to the at least one server through at least one permanent connection which is established on the network 10.

The servers 210 and 220 are computers which provide a data processing service in response to processing requests sent from the clients 310 and 320. For example, the servers 210 and 220 are application servers or web servers.

The clients 310 and 320 are computers which output processing requests in response to users' manipulation inputs or the like, and receive responses from the servers 210 and 220 through the server-load-balancing apparatus 100.

Figure 3:
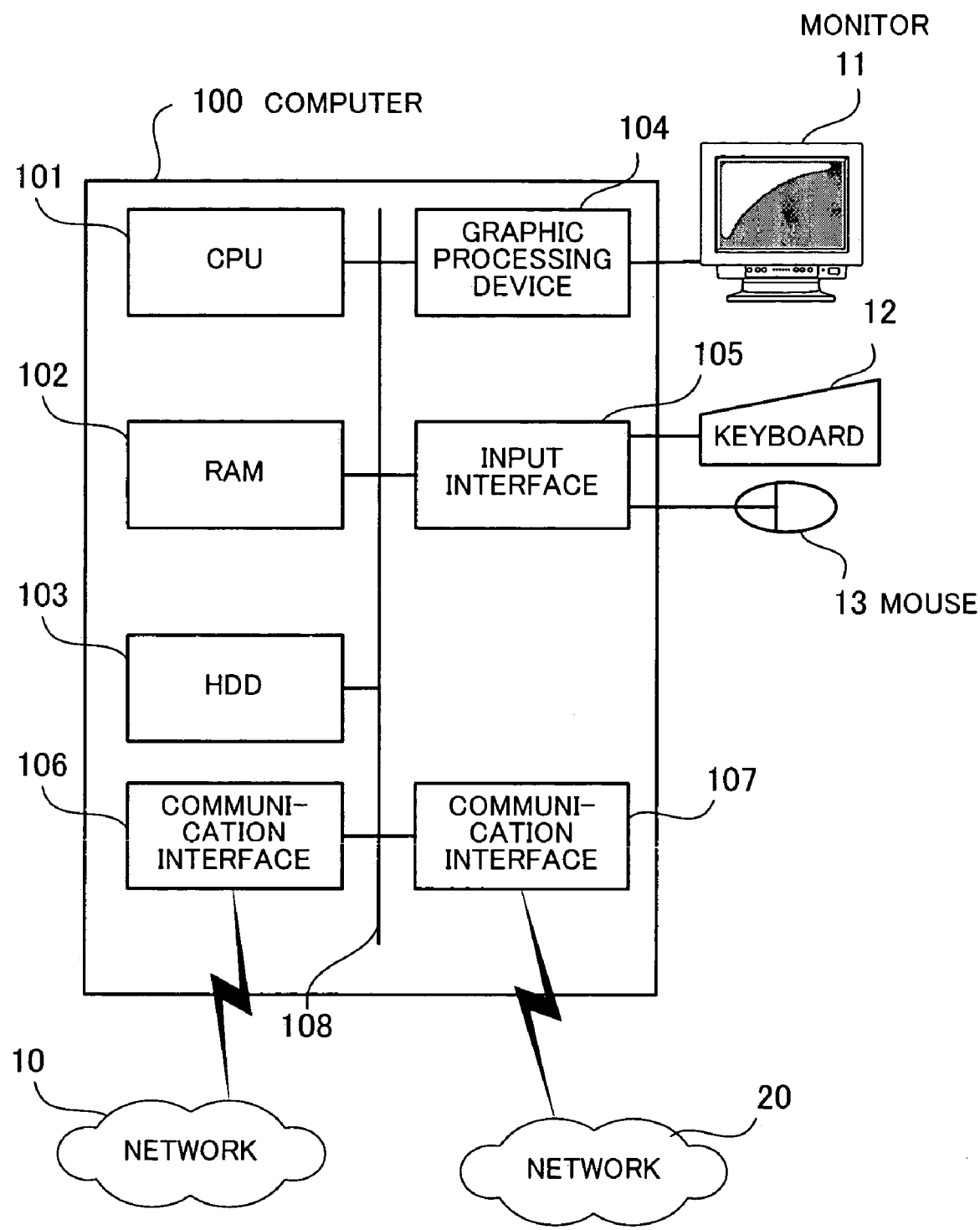
FIG. 3 is a diagram illustrating an example of a hardware construction of a server-load-balancing apparatus in the embodiment of the present invention.

FIG. 3 is a diagram illustrating an example of a hardware construction of the server-load-balancing apparatus in the embodiment of the present invention. The entire system of the server-load-balancing apparatus 100 is controlled by a CPU (central processing unit) 101, to which a RAM (random access memory) 102, an HDD (hard disk drive) 103, a graphic processing device 104, an input interface 105, and communication interfaces 106 and 107 are connected.

The RAM 102 temporarily stores at least portions of an OS (operating system) program and application programs which are executed by the CPU 101, as well as various types of data necessary for processing by the CPU 101. The HDD 103 stores the OS and the application programs.

A monitor 11 is connected to the graphic processing device 104, which makes the monitor 11 display an image on a screen in accordance with an instruction from the CPU 101. A keyboard 12 and a mouse 13 are connected to the input interface 105, which transmits signals sent from the keyboard 12 and the mouse 13, to the CPU 101 through the bus 108.

The communication interface 106 is connected to the network 10. The communication interface 106 is provided for exchanging data with the servers 210 and 220 through the network 10.

The communication interface 107 is provided for exchanging data with the clients 310 and 320 through the network 20.

By using the above hardware construction, it is possible to realize processing functions in the embodiment of the present invention. Although FIG. 3 shows a hardware construction of the server-load-balancing apparatus 100, each of the servers 210 and 220 and the clients 310 and 320 can also be realized by using a similar hardware construction, except that only one communication interface is necessary in each of the servers 210 and 220 and the clients 310 and 320.

Figure 4:
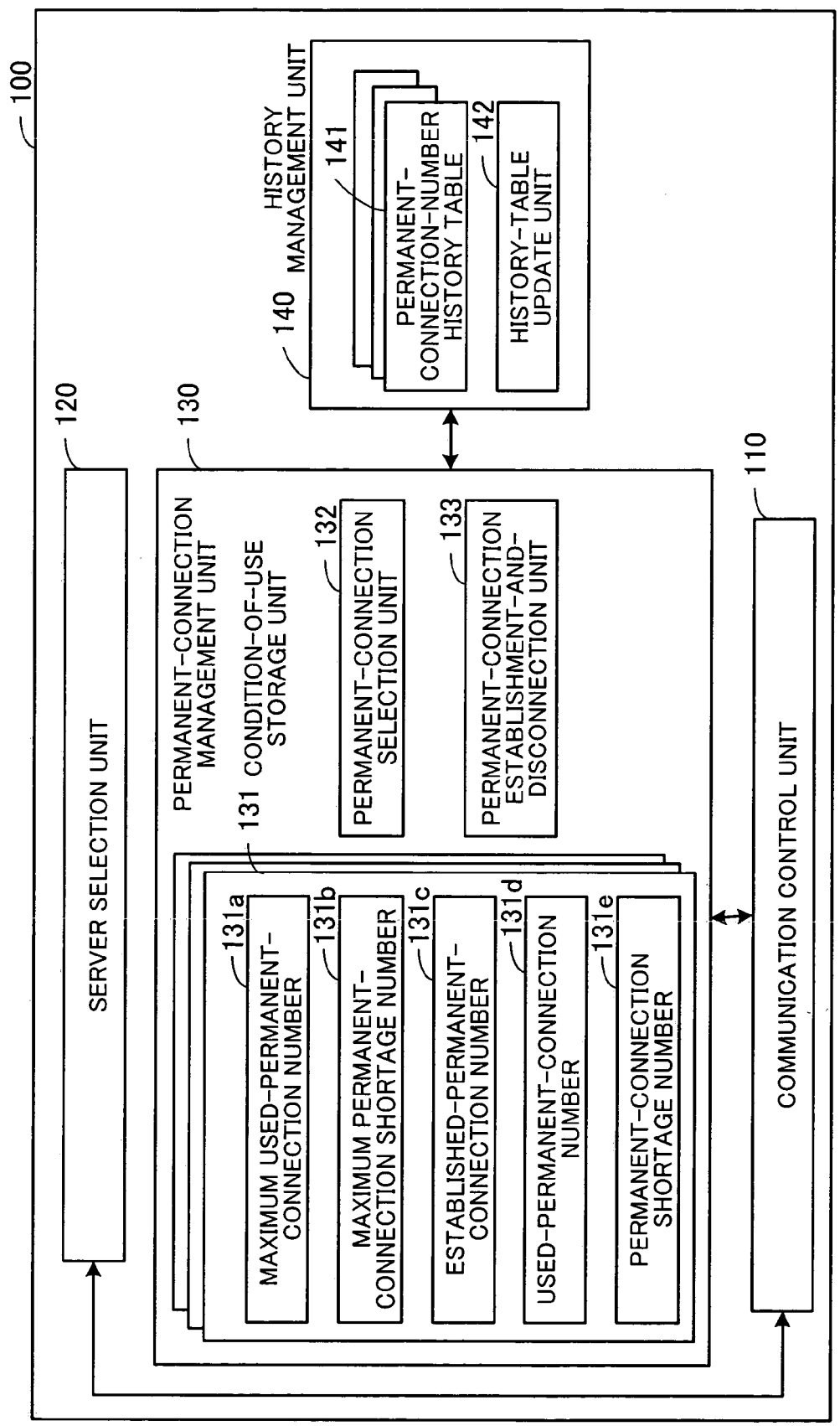
FIG. 4 is a block diagram illustrating functions of the server-load-balancing apparatus.

FIG. 4 is a block diagram illustrating functions of the server-load-balancing apparatus. As illustrated in FIG. 4, the server-load-balancing apparatus 100 comprises a communication control unit 110, a server selection unit 120, a permanent-connection management unit 130, and a history management unit 140.

The communication control unit 110 exchanges data with other devices through the networks 10 and 20. For example, the communication control unit 110 receives a processing request sent from the clients 310 and 320 to the server-load-balancing apparatus 100, and transmits the processing request to a server to which the processing request is determined to be distributed. In addition, when the communication control unit 110 receives from the server 210 or 220 a response containing a processing result, the communication control unit 110 sends the response to the client which outputs the processing request.

Further, the communication control unit 110 can recognize the server to which the processing request is determined to be distributed, by inquiring the server from the server selection unit 120. Furthermore, when the communication control unit 110 receives a notification from the permanent-connection management unit 130, the communication control unit 110 can determine a permanent connection which is to be used in transmission of the processing request.

The server selection unit 120 monitors the loads imposed on the servers 210 and 220. In addition, the server selection unit 120 selects one of the servers which has a function of executing the processing request and on which a lighter load is imposed, and notifies the communication control unit 110 of a result of the selection.

The permanent-connection management unit 130 manages establishment and disconnection of at least one permanent connection to each server. For this purpose, the permanent-connection management unit 130 comprises condition-of-use storage units 131, a permanent-connection selection unit 132, and a permanent-connection establishment-and-disconnection unit 133, where the condition-of-use storage units 131 are provided for the servers 210 and 220, respectively, for storing information on the conditions of use of at least one permanent connection to each server.

Each of the condition-of-use storage units 131 is a function of storing information indicating the conditions of use of at least one permanent connection to the corresponding server. Each condition-of-use storage unit 131 stores information items: the maximum used-permanent-connection number 131a, the maximum permanent-connection shortage number 131b, the established-permanent-connection number 131c, the used-permanent-connection number 131d, and the permanent-connection shortage number 131e. That is, the above information items are provided for each of the servers 210 and 220, which are connected through. the network 10.

Figure 7:
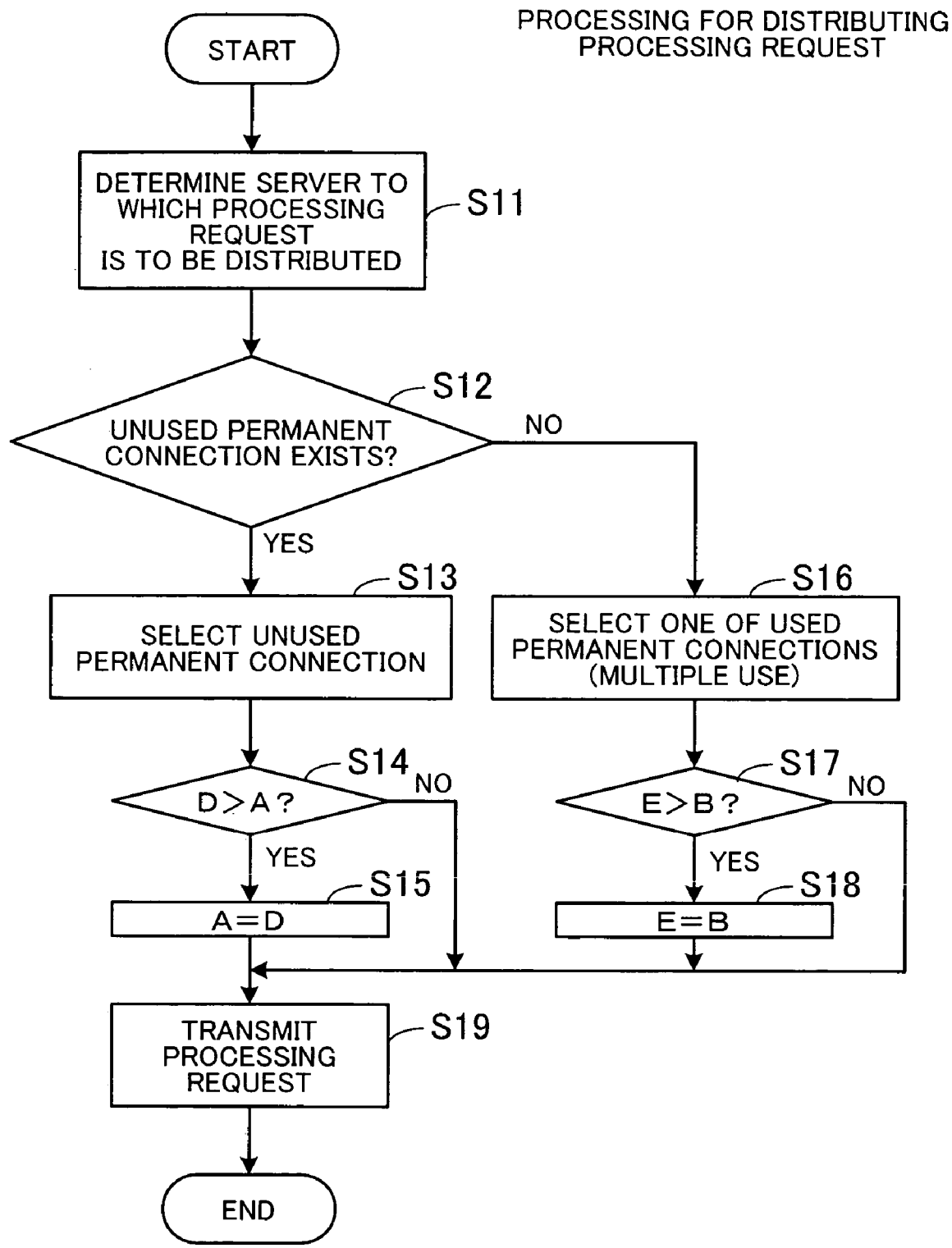
FIG. 7 is a flow diagram illustrating processing for distributing a processing request to a server.
Figure 8:
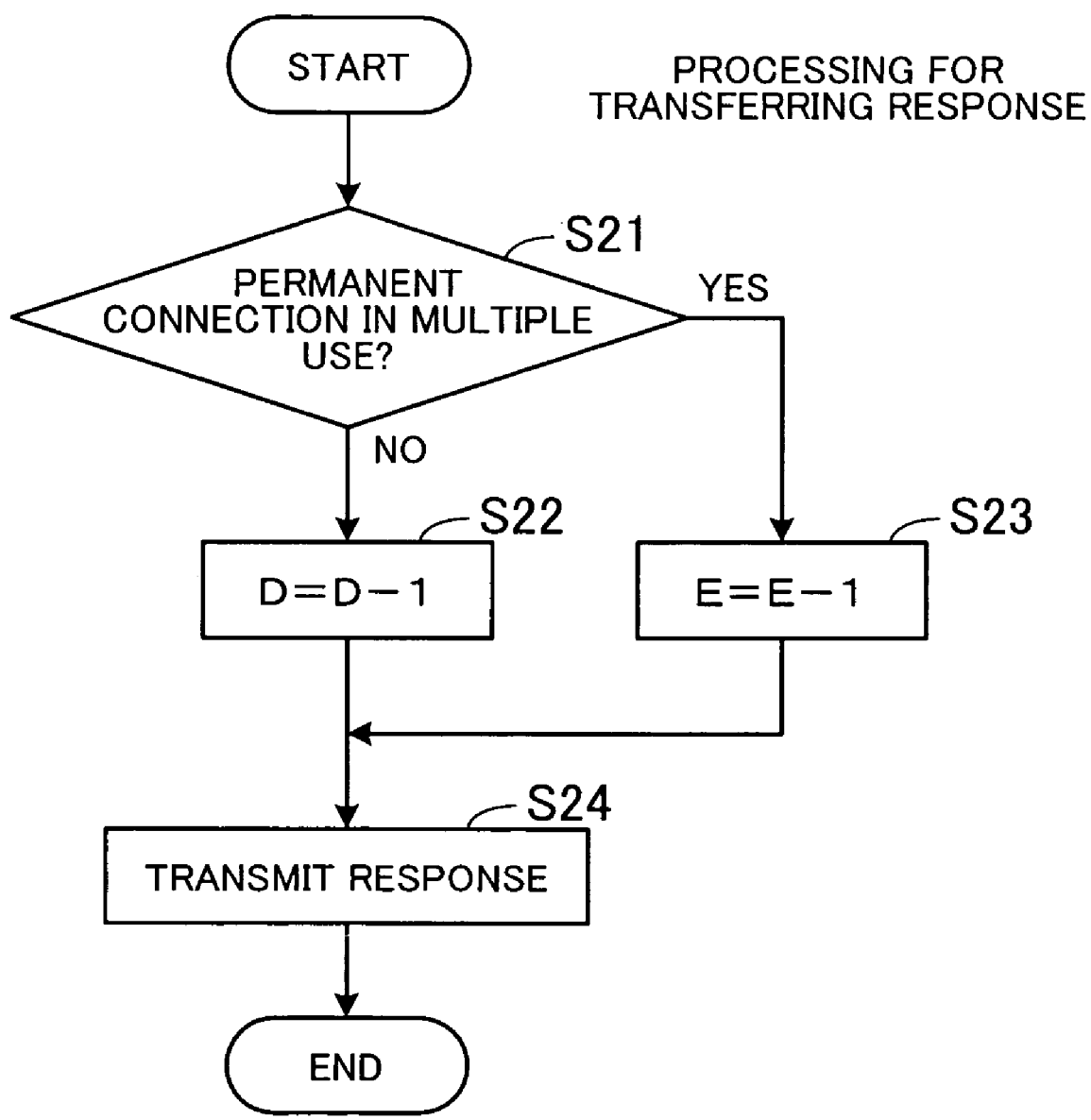
FIG. 8 is a flow diagram illustrating processing for transferring a response.
Figure 9:
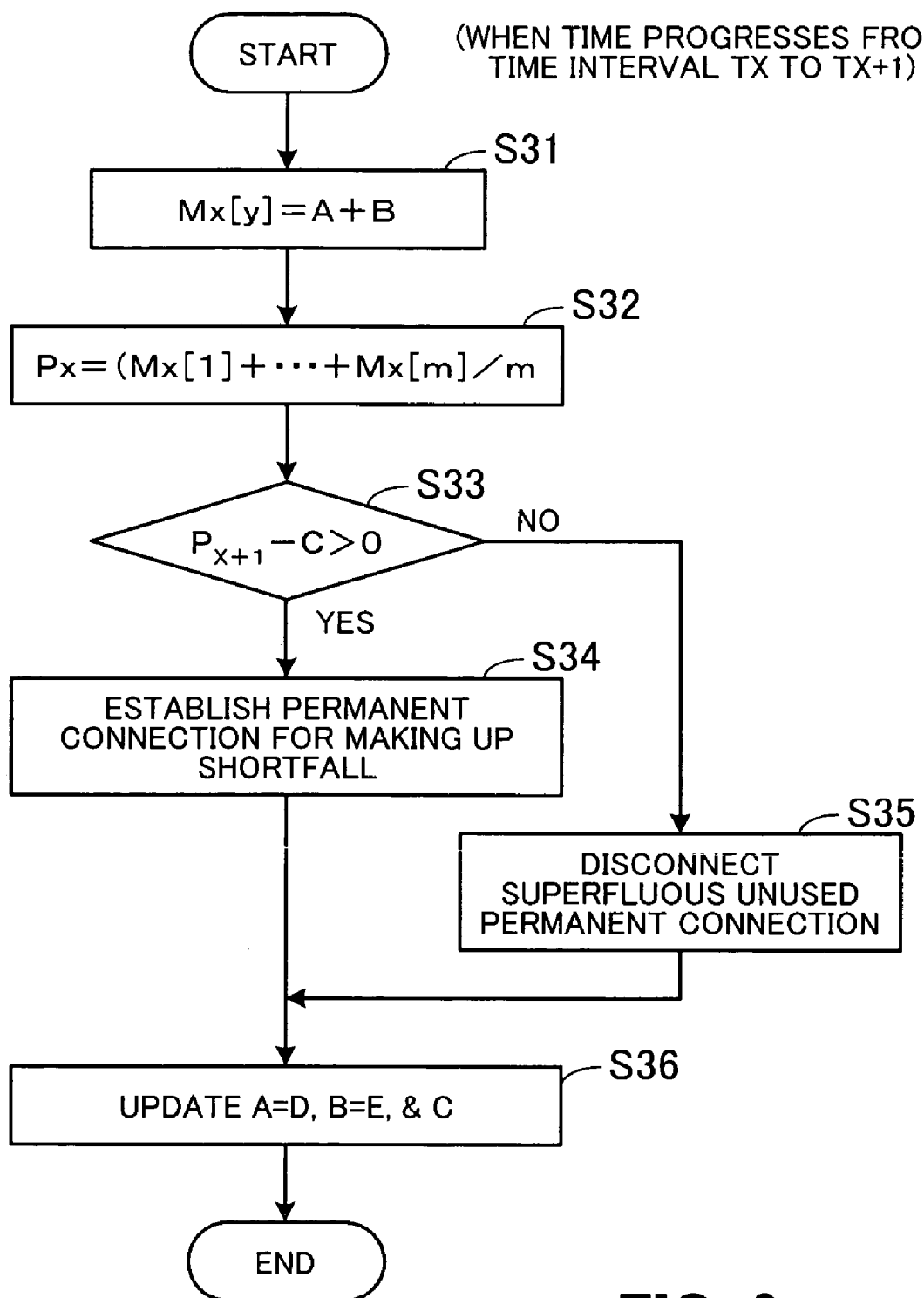
FIG. 9 is a flow diagram illustrating processing for establishing or disconnecting a permanent connection.

The maximum used-permanent-connection number 131a is the maximum value of the number of one or more permanent connections which are used during the current time interval (i.e., a time interval including the current time). In FIGS. 7 to 9, which are referred to later, the maximum used-permanent-connection number 131a is indicated by "A."

The maximum permanent-connection shortage number 131b is the maximum value of the permanent-connection shortage number 131e during the current time interval (i.e., a time interval including the current time). In FIGS. 7 to 9, the maximum permanent-connection shortage number 131b is indicated by "B."

The established-permanent-connection number 131c is the number of one or more permanent connections which are currently established between the server-load-balancing apparatus 100 and the corresponding server. In FIGS. 7 to 9, the established-permanent-connection number 131c is indicated by "C."

The used-permanent-connection number 131d is the number of one or more permanent connections which are currently used between the server-load-balancing apparatus 100 and the corresponding server. In FIGS. 7 to 9, the used-permanent-connection number 131d is indicated by "D."

The permanent-connection shortage number 131e is a number by which the established-permanent-connection number 131c for the corresponding server is smaller than the number of processing requests which are currently determined to be distributed to the corresponding server. In FIGS. 7 to 9, the permanent-connection shortage number 131e is indicated by "E."

The permanent-connection selection unit 132 selects a permanent connection which is to be assigned to each processing request. When the conditions of use of one or more permanent connections to the corresponding server are changed by the selection of the permanent connection, the permanent-connection selection unit 132 updates information stored in one of the condition-of-use storage units 131 corresponding to the server.

When time progresses from each time interval to the next interval, the permanent-connection establishment-and-disconnection unit 133 establishes or disconnects one or more permanent connections to each server so that the number of one or more permanent connections to the server which are established in the next time interval is equal to an optimum number of the one or more permanent connections which is set for the server and the next time interval. In addition, when the conditions of use of one or more permanent connections to each server are changed by the establishment or disconnection, the permanent-connection establishment-and-disconnection unit 133 updates corresponding information stored in one of the condition-of-use storage units 131 corresponding to the server.

The history management unit 140 stores as history information necessary numbers of one or more permanent connections (hereinafter referred to as necessary permanent-connection numbers) in preceding time intervals. In addition, the history management unit 140 also stores optimum numbers of the one or more permanent connections in the preceding time intervals. For these purposes, the history management unit 140 comprises permanent-connection-number history tables 141 and a history-table update unit 142, where the permanent-connection-number history tables 141 are provided for the servers 210 and 220, respectively.

In each of the permanent-connection-number history tables 141, the necessary permanent-connection numbers to the corresponding server in respective time intervals in a predetermined number of preceding periods (e.g., in the immediately preceding week) are stored as the history information, where each period has a first predetermined length (e.g., a day), and is divided into a plurality of time intervals each having a second predetermined length (e.g., an hour).

When time progresses from each time interval to the next interval, the history-table update unit 142 acquires the maximum used-permanent-connection number 131a and the maximum permanent-connection shortage number 131b from one of the condition-of-use storage units 131 for the corresponding server in the permanent-connection management unit 130, and updates information in one of the permanent-connection-number history tables 141 for the corresponding server.

FIG. 5 is a diagram illustrating an example of a data structure of each of the permanent-connection-number history tables 141. Each of the permanent-connection-number history tables 141 has columns for the time interval (T), the necessary permanent-connection number, and the optimum number of permanent connections.

In the column of the time interval (T), time intervals constituting a period having the first predetermined length (e.g., a day) are indicated, and each period is divided into a predetermined number of time intervals (e.g., 24 time intervals having identical lengths). In the example of FIG. 5, each period is divided into n time intervals, $T_1, T_2, \ldots, T_n$, where n is a natural number.

In the column of the necessary permanent-connection number, the necessary numbers of one or more permanent connections in the preceding time intervals $T_1, T_2, \ldots, T_n$ are set as history information. In each time interval, each value of the necessary numbers of permanent connections is a sum of a value of the maximum used-permanent-connection number 131a and a value of the maximum permanent-connection shortage number 131b. In the example of FIG. 5, history information in the m preceding periods is stored, and the necessary number of one or more permanent connections in the ith time interval in the jth one of the m preceding periods is indicated by Mi[j], where m, i, and j are natural numbers, $1 \leq i \leq n$, $1 \leq j \leq m$, and Mi[j] is older when the value of j is greater.

The optimum number of one or more permanent connections in each of the preceding time intervals $T_1, T_2, \ldots, T_n$ is calculated based on the necessary numbers of one or more permanent connections in the time interval. The optimum number is determined so as to maximize the system operation efficiency in consideration of delays in responses to processing requests in the case of shortage of permanent connections, useless occupation of resources such as the server-load-balancing apparatus and the servers in the case of surplus of permanent connections, and the like. For example, the optimum number of permanent connections may be an average of the necessary numbers of permanent connections in the preceding periods. In the example of FIG. 5, the optimum numbers of permanent connections in the preceding time intervals $T_1, T_2, \ldots, T_n$ are indicated by $P_1, P_2, \ldots, P_n$.

Alternatively, in the case where importance is placed on promptness of responses to processing requests, the optimum number may be determined to be the greatest one of the necessary numbers of permanent connections in the preceding periods. Further, in the case where importance is placed on efficient utilization of resources such as the server-load-balancing apparatus and the servers, the optimum number may be determined to be the smallest one of the necessary numbers of permanent connections in the preceding periods.

The server-load-balancing apparatus 100 having the above construction performs processing for establishing optimum numbers of permanent connections according to circumstances, as well as processing for distributing processing requests among the servers.

Figure 6:
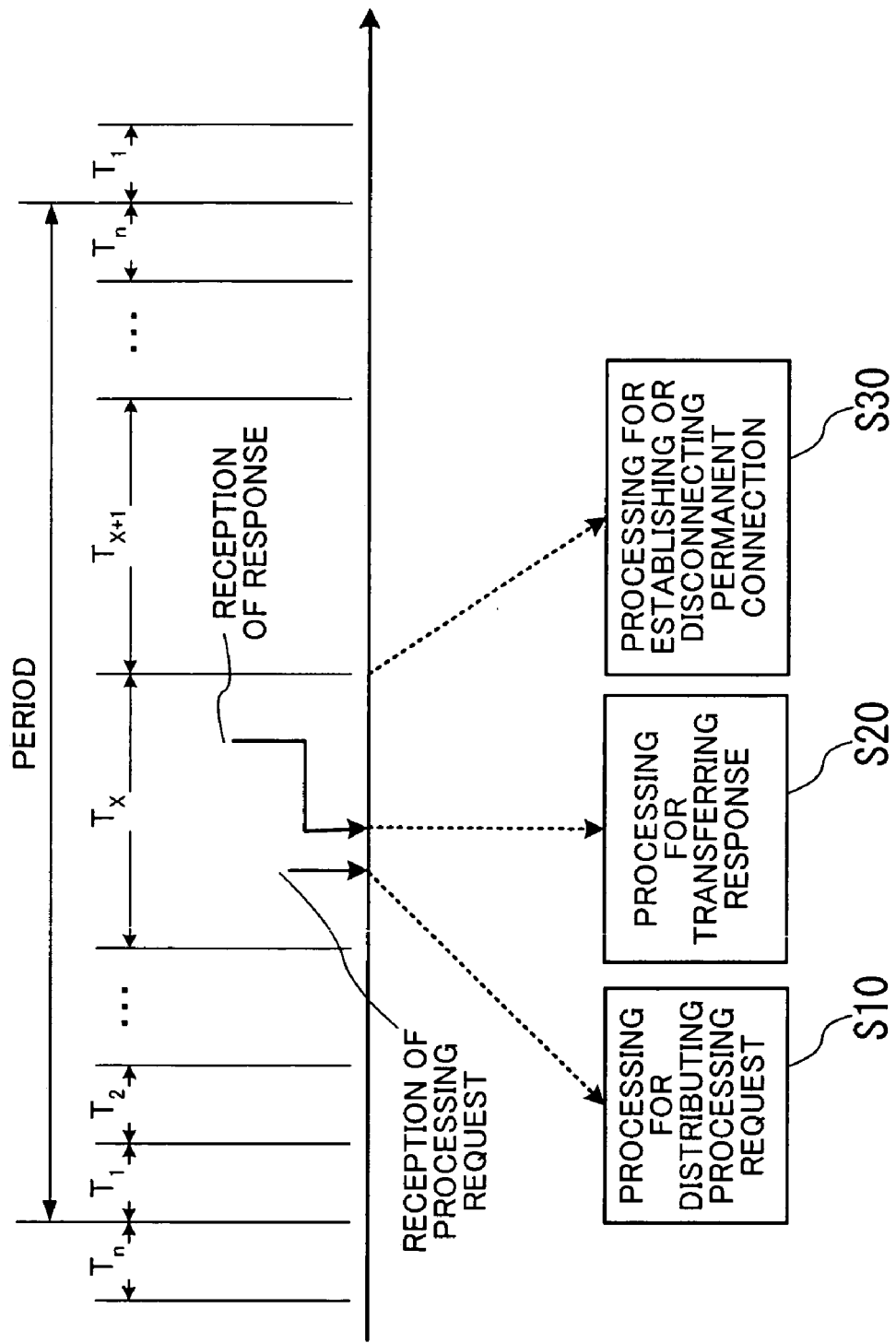
FIG. 6 is a diagram illustrating timings of processing executed by the server-load-balancing apparatus.

FIG. 6 is a diagram illustrating timings of processing executed by the server-load-balancing apparatus. In FIG. 6, the abscissa indicates progression of time, and each period is divided into n time intervals $T_1, T_2, \ldots, T_n$. An optimum number of one or more permanent connections in each time interval is calculated, and one or more permanent connections are established in each time interval so that the number of the one or more established permanent connections in each time interval is equal to the calculated optimum number. Thus, by using the one or more permanent connections, processing for distribution of processing requests and processing of reception of responses are performed.

For example, when the server-load-balancing apparatus 100 receives a processing request from a client during the time interval $T_x$, the server-load-balancing apparatus 100 performs processing for distributing the processing request to a server (in step S10). Thereafter, when the server-load-balancing apparatus 100 receives a response to the processing request from the server, the server-load-balancing apparatus 100 performs processing for transferring the response (in step S20).

In addition, when time progresses from the time interval $T_x$ to the time interval $T_{x+1}$ following the time interval $T_x$, the server-load-balancing apparatus 100 performs processing for establishment or disconnection of permanent connections (in step S30).

Hereinbelow, details of the above processing are explained with reference to flow diagrams. First, details of the processing (corresponding to step S10 in FIG. 6) for distributing a processing request to a server are explained below with reference to FIG. 7, which is a flow diagram illustrating processing for distributing a processing request to a server. As mentioned above, the processing of FIG. 7 is performed when a processing request from a client is inputted into the server-load-balancing apparatus 100. The processing illustrated in FIG. 7 is explained below step by step.

[Step S11] The server selection unit 120 determines a server to which the processing request is to be distributed. Specifically, the processing request inputted into the server-load-balancing apparatus 100 is received by the communication control unit 110; which notifies the server selection unit 120 of details of the processing request, and requests the server selection unit 120 to determine a server to which the processing request is to be distributed. The server selection unit 120 monitors the load condition of each server, and determines one of the servers having a function of executing the processing request and bearing a light load to be the server to which the processing request is to be distributed. Then, the server selection unit 120 passes to the communication control unit 110 identification information identifying the server determined by the server selection unit 120.

[Step S12] The permanent-connection selection unit 132 determines whether or not an unused permanent connection exists. Specifically, first, the communication control unit 110 outputs to the permanent-connection management unit 130 the identification information identifying the server to which the processing request is to be distributed and a request for selection of a permanent connection. Then, the permanent-connection selection unit 132 in the permanent-connection management unit 130 compares the established-permanent-connection number 131c and the used-permanent-connection number 131d for the server to which the processing request is to be distributed.

When the comparison indicates that the established-permanent-connection number 131c is greater than the used-permanent-connection number 131d, the permanent-connection selection unit 132 determines that an unused permanent connection exists. On the other hand, when the comparison indicates that the established-permanent-connection number 131c is identical to the used-permanent-connection number 131d, the permanent-connection selection unit 132 determines that no unused permanent connection exists.

When it is determined that an unused permanent connection exists, the operation goes to step S13. When it is determined that no unused permanent connection exists, the operation goes to step S16.

[Step S13] When it is determined that an unused permanent connection exists, the permanent-connection selection unit 132 selects an unused one of one or more permanent connections established between the server-load-balancing apparatus and the server to which the processing request is to be distributed. Then, the permanent-connection selection unit 132 adds one to the value of the used-permanent-connection number 131d for the server to which the processing request is to be distributed (i.e., D=D+1).

[Step S14] The permanent-connection selection unit 132 compares the maximum used-permanent-connection number 131a and the used-permanent-connection number 131d for the server to which the processing request is to be distributed (i.e., D>A?). When the used-permanent-connection number 131d is greater than the maximum used-permanent-connection number 131a, the operation goes to step S15. When the used-permanent-connection number 131d is not greater than the maximum used-permanent-connection number 131a, the operation goes to step S19.

[Step S15] The permanent-connection selection unit 132 sets the value of the used-permanent-connection number 131d as the maximum used-permanent-connection number 131a (i.e., A=D). Thereafter, the operation goes to step S19.

[Step S16] When no unused permanent connection exists, the permanent-connection selection unit 132 selects one of one or more used permanent connections established between the server-load-balancing apparatus and the server to which the processing request is to be distributed, as a permanent connection for transmission of the inputted processing request.

In this case, multiple use of the selected permanent connection occurs. When the permanent connection is multiply used, processing in response to the currently inputted processing request must wait for completion of communication which is currently performed through the selected permanent connection. When the communication currently performed is completed, communication for the processing request which has waited for the completion is performed through the selected permanent connection.

[Step S17] The permanent-connection selection unit 132 compares the permanent-connection shortage number 131e and the maximum permanent-connection shortage number 131b for the server to which the processing request is to be distributed (i.e., E>B?). When the permanent-connection shortage number 131e is greater than the maximum permanent-connection shortage number 131b, the operation goes to step S18. When the permanent-connection shortage number 131e is not greater than the maximum permanent-connection shortage number 131b, the operation goes to step S19.

[Step S18] The permanent-connection selection unit 132 sets the value of the permanent-connection shortage number 131e as the maximum permanent-connection shortage number 131b (i.e., B=E).

[Step S19] The currently inputted processing request is transmitted through the permanent connection which is established in advance between the server-load-balancing apparatus and the server to which the processing request is to be distributed, and selected as above.

Specifically, the permanent-connection selection unit 132 notifies the communication control unit 110 of the permanent connection selected in step S13 or S16. When the unused permanent connection is selected, the communication control unit 110 transmits the processing request through the unused permanent connection. On the other hand, when the used permanent connection is selected, the communication control unit 110 transmits the currently inputted processing request through the used permanent connection, after the completion of the communication for another processing request which is earlier assigned to the selected permanent connection.

Next, details of the processing (corresponding to step S20 in FIG. 6) for transferring a response are explained.

FIG. 8 is a flow diagram illustrating processing for transferring a response. The processing of FIG. 8 is performed when a response to the processing request is returned from the server to which the processing request is transmitted. The processing illustrated in FIG. 8 is explained below step by step.

[Step S21] The permanent-connection selection unit 132 determines whether or not the permanent connection through which the response is received is multiply used.

Specifically, the response returned from the server is received by the communication control unit 110, which determines whether or not the permanent connection through which the response is received is multiply used.

When the permanent connection through which the response is received is not multiply used, the operation goes to step S22. On the other hand, when the permanent connection through which the response is received is multiply used, the operation goes to step S23.

[Step S22] The permanent-connection selection unit 132 subtracts one from the value of the used-permanent-connection number 131d for the server which returns the response (i.e., D=D−1). Thereafter, the operation goes to step S24.

[Step S23] The permanent-connection selection unit 132 subtracts one from the value of the permanent-connection shortage number 131e for the server which returns the response (i.e., E=E−1).

[Step S24] The communication control unit 110 transmits the response returned from the server, to the client which outputs the currently inputted processing request.

Next, details of the processing (corresponding to step S30 in FIG. 6) for establishment or disconnection of at least one permanent connection to each server are explained.

FIG. 9 is a flow diagram illustrating processing for establishing or disconnecting at least one permanent connection to each server when time progresses from each time interval to the next interval. In the example of FIG. 9, time progresses from the time interval $T_x$ to the time interval $T_{x+1}$. The processing illustrated in FIG. 9 is explained below step by step.

[Step S31] When time progresses from the time interval $T_x$ to the time interval $T_{x+1}$, the history-table update unit 142 calculates the latest value of the necessary permanent-connection number in the time interval $T_x$ for the server, where the necessary permanent-connection number is a sum of the maximum used-permanent-connection number 131a and the maximum permanent-connection shortage number 131b (i.e., Mx[y]=A+B).

In the example of FIG. 9, in one of the permanent-connection-number history tables 141 corresponding to the server, the latest value of the necessary permanent-connection number in the time interval $T_x$ is set as Mx[1], and the oldest value of the necessary permanent-connection number (e.g., Mx[7] in the case where m=7 in FIG. 5) is deleted. In addition, the other values of the necessary permanent-connection numbers registered in the corresponding permanent-connection-number history table for the time interval $T_x$ are respectively shifted to the adjacent columns corresponding to older periods.

[Step S32] The history-table update unit 142 calculates an average of the necessary permanent-connection numbers in the time interval $T_x$ in a predetermined number of preceding periods, and sets the calculated average as the optimum number of one or more permanent connections in the time interval $T_x$. For example, $P_x=(Mx[1]+ \ldots +Mx[m])/m$.

[Step S33] The permanent-connection establishment-and-disconnection unit 133 refers to the corresponding permanent-connection-number history table 141, subtracts the established-permanent-connection number 131c from the optimum number of one or more permanent connections in the time interval $T_{x+1}$, and determines whether or not the subtracted result is greater than zero (i.e., $P_{x+1}-C>0$). When the subtracted result is greater than zero, the operation goes to step S34. On the other hand, when the subtracted result is not greater than zero, the operation goes to step S35.

[Step S34] The permanent-connection establishment-and-disconnection unit 133 newly establishes at least one permanent connection for making up the shortage, where the number of the at least one permanent connection for making up the shortage is obtained by subtracting the established-permanent-connection number 131c from the optimum number of one or more permanent connections in the time interval $T_{x+1}$. Thereafter, the operation goes to step S36.

[Step S35] The permanent-connection establishment-and-disconnection unit 133 disconnects at least one superfluous unused permanent connection, where the number of the at least one superfluous unused permanent connection is obtained by subtracting the optimum number of one or more permanent connections from the established-permanent-connection number 131c in the time interval $T_{x+1}$.

In addition, in the case where the number of currently used permanent connections is greater than the optimum number of one or more permanent connections in the time interval $T_{x+1}$ (i.e., the number of at least one unused permanent connection is less than the surplus number of permanent connections), the permanent-connection establishment-and-disconnection unit 133 performs processing for disconnecting the surplus number of permanent connections after the use of the used permanent connections is completed.

[Step S36] The permanent-connection establishment-and-disconnection unit 133 updates (initializes) the values in the corresponding one of the condition-of-use storage units 131 to the values for the time interval $T_{x+1}$.

Specifically, the permanent-connection establishment-and-disconnection unit 133 sets the value of the used-permanent-connection number 131d as the maximum used-permanent-connection number 131a (i.e., A=D) and the value of the permanent-connection shortage number 131e as the maximum permanent-connection shortage number 131b (i.e., B=E), and updates the value of the established-permanent-connection number 131c.

The processing of FIG. 9 for establishing or disconnecting at least one permanent connection is individually performed for each server.

Since the optimum number of one or more permanent connections in each time interval is calculated according to actual operational conditions as explained above, it is possible to reflect the operational conditions of the system in one or more permanent connections to each server by establishing the one or more permanent connections so that the number of the one or more established permanent connections is equal to the optimum number.

Hereinbelow, examples of settings of the optimum numbers of permanent connections are explained, where each period having a length of a day is divided into time intervals each having a length of an hour, and each of the permanent-connection-number history tables 141 (corresponding to a server) stores history information including the necessary permanent-connection numbers in the seven preceding periods (the immediately preceding week) for the server.

FIG. 10 is a diagram illustrating an example of information registered in one of the permanent-connection-number history tables corresponding to a server.

In the example of FIG. 10, each period having a length of a day (24 hours) is divided into 24 time intervals: between 0 and 1 o'clock, between 1 and 2 o'clock, . . . and between 23 and 24 o'clock, and the necessary permanent-connection numbers in the respective time intervals in the seven preceding periods (the immediately preceding week) for the server are set. For example, in the time interval between 0 to 1 o'clock, the necessary permanent-connection number in the immediately preceding period for the server is "10," the necessary permanent-connection number in the period preceding the current period by two days for the server is "9," the necessary permanent-connection number in the period preceding the current period by three days for the server is "13," the necessary permanent-connection number in the period preceding the current period by four days for the server is "9," the necessary permanent-connection number in the period preceding the current period by five days for the server is "8," the necessary permanent-connection number in the period preceding the current period by six days for the server is "14," and the necessary permanent-connection number in the period preceding the current period by seven days for the server is "7."

In this example, an average of the necessary permanent-connection numbers (which are set as the history information) in each time interval is determined to be the optimum number of permanent connections in the time interval. Thus, the optimum number of permanent connections in the time interval between 0 to 1 o'clock is calculated to be "10," where the calculated value is rounded off to the nearest whole number.

In the case where the values as illustrated in FIG. 10 are set in each permanent-connection-number history table 141, the information in the corresponding condition-of-use storage unit 131 is updated when the date changes (i.e., at 0 o'clock).

At this time, in the case where the number of used permanent connections to a server at 0 o'clock is "8," in the corresponding one of the condition-of-use storage units 131 immediately after the update of the information, the maximum used-permanent-connection number 131a is "8," the maximum permanent-connection shortage number 131b is "0," the established-permanent-connection number 131c is "10," the used-permanent-connection number 131d is "8," and the permanent-connection shortage number 131e is "0."

Each value in the condition-of-use storage units 131 varies with the operational conditions of the system (the state of distribution of processing requests to servers).

Figure 11:
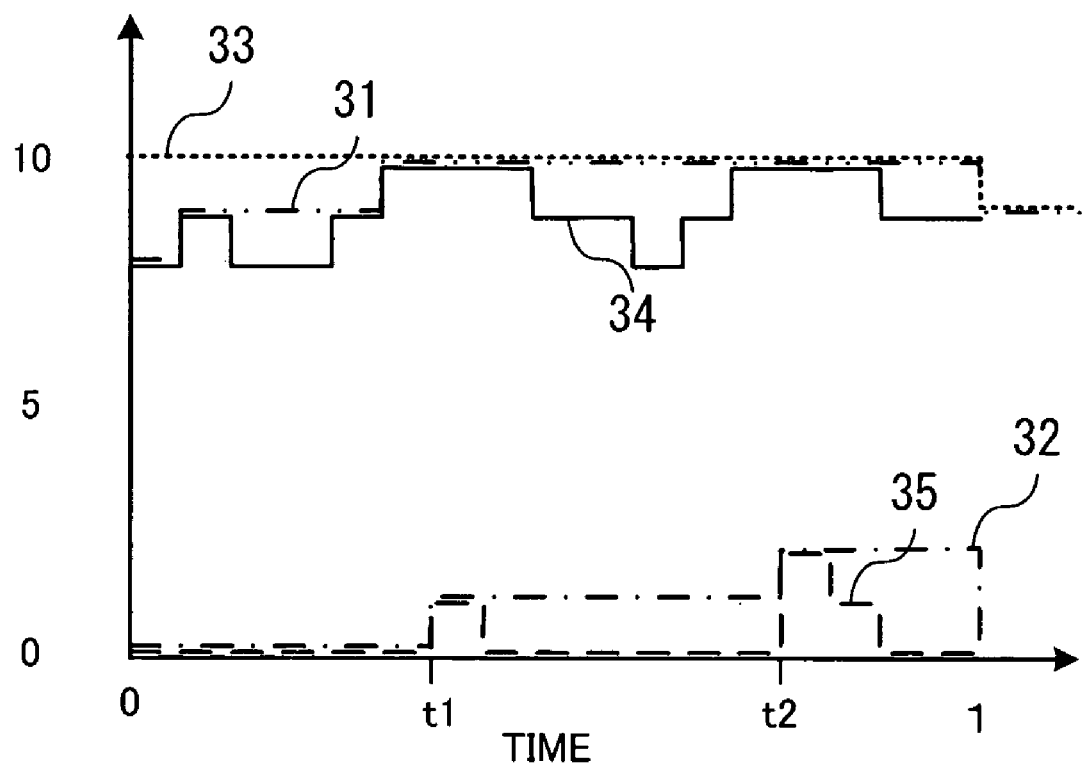
FIG. 11 is a diagram illustrating examples of changes of information in one of the condition-of-use storage units according to the operational conditions.

FIG. 11 is a diagram illustrating examples of changes of information in one of the condition-of-use storage units 131 according to the operational conditions. In FIG. 11, the abscissa corresponds to progression of time, and the ordinate corresponds to the value of each of the information items (the numbers of permanent connections) 131a to 131e.

In FIG. 11, the variations in the maximum used-permanent-connection number 131a are indicated by dash-dot-dot lines 31, the variations in the maximum permanent-connection shortage number 131b are indicated by dash-dot lines 32, the variations in the established-permanent-connection number 131c are indicated by short-dashed lines 33, the variations in the used-permanent-connection number 131d are indicated by solid lines 34, and the variations in the permanent-connection shortage number 131e are indicated by long-dashed lines 35.

In the example of FIG. 11, a shortfall of one permanent connection occurs at the time t1, and a shortfall of two permanent connections occurs at the time t2.

In the case where the system is used under the above conditions, for example, a portion of the information registered in the corresponding one of the permanent-connection-number history tables 141 is updated at 1 o'clock, i.e., when time progresses from the time interval between 0 and 1 o'clock to the next time interval between 1 and 2 o'clock.

FIG. 12 is a diagram illustrating an example of information registered in the corresponding permanent-connection-number history table after the above update.

As illustrated in FIG. 12, for the time interval between 0 and 1 o'clock, "12" is set as the latest value of the necessary permanent-connection number, the oldest value of the necessary permanent-connection number (e.g., the history information for the period preceding the current period by seven days) is deleted, and the other values of the necessary permanent-connection numbers are respectively shifted to the adjacent columns corresponding to older periods in the permanent-connection-number history table 141. Then, the optimum number "11" of permanent connections in the time interval between 0 and 1 o'clock is calculated based on the history information including the necessary permanent-connection numbers after the update. That is, since the latest value of the necessary permanent-connection number is greater than the average, the optimum number of permanent connections is increased by the update.

As explained above, the conditions of use of permanent connections in the preceding periods are statistically analyzed. Therefore, it is possible to establish an optimum number of permanent connections according to operational conditions.

In the embodiment explained above, when there is no unused permanent connection which can be used in transmission of a processing request, a permanent connection is multiply used. Alternatively, it is possible to newly establish a temporary connection. In the latter case, the number of temporary connections which are concurrently established corresponds to the permanent-connection shortage number.

In addition, in the above explanations, it is assumed that a desired number of permanent connections can always be established. However, sometimes, a desired number of permanent connections cannot be established depending on operational conditions of the system. In this case, at least one permanent connection which cannot be established is not counted in the shortfall of permanent connections, even when multiple use of at least one permanent connection occurs. That is, multiple use which can be avoided when permanent connections corresponding to the optimum number can be normally established is not deemed as shortage of permanent connections.

The above processing functions can be realized by a computer. In this case, a program (a server-load-balancing program) describing details of processing for realizing the functions which the server-load-balancing apparatus should have is provided. When the computer executes the program, the above processing functions can be realized on the computer.

The program describing the details of the processing can be stored in a recording medium which can be read by the computer. The recording medium may be a magnetic recording device, an optical disc, an optical magnetic recording medium, a semiconductor memory, or the like. The magnetic recording device may be a hard disk drive (HDD), a flexible disk (FD), a magnetic tape, or the like. The optical disc may be a DVD (Digital Versatile Disc), a DVD-RAM (Random Access Memory), a CD-ROM (Compact Disc Read Only Memory), a CD-R (Recordable)/RW (ReWritable), or the like. The optical magnetic recording medium may be an MO (Magneto-Optical Disc) or the like.

In order to put the program into the market, for example, it is possible to sell a portable recording medium such as a DVD or a CD-ROM in which the program is recorded. Alternatively, it is possible to store the program in a storage device belonging to a server computer, and transfer the program to another computer through a network.

The computer which executes the program stores the program in a storage device belonging to the computer, where the program is originally recorded in, for example, a portable recording medium. The computer reads the program from the storage device, and performs processing in accordance with the program. Alternatively, the computer may directly read the program from the portable recording medium for performing processing in accordance with the program. Further, the computer can sequentially execute processing in accordance with each portion of the program every time the portion of the program is transferred from the server computer.

As explained above, according to the present invention, the optimum number of permanent connections is determined according to conditions of use of permanent connections in each of preceding time intervals, and permanent connections corresponding to the determined optimum number are established between the server-load-balancing apparatus and each server. Therefore, it is possible to make the number of the permanent connections established between the server-load-balancing apparatus and each server optimized according to operational conditions.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A server-load-balancing program which is executed by a computer and makes said computer perform a process for establishing a permanent connection between the computer and a server in advance, and requesting the server to execute a processing request received from a client, by using the permanent connection, said process comprises the steps of:
   (a) storing history information indicating conditions of use of at least one permanent connection in each of a plurality of first time intervals into which each of at least one preceding period is divided;
   (b) determining an optimum value of the number of at least one permanent connection to be established in each of a plurality of second time intervals into which a coming period is divided, based on said history information, where the plurality of second time intervals correspond to the plurality of first time intervals, respectively; and
   (c) establishing between said computer and said server said at least one permanent connection in each of said plurality of second time intervals in the coming period so that the number of the at least one permanent connection in each of the plurality of second time intervals is equal to said optimum value.

2. The server-load-balancing program according to claim 1, wherein said optimum value is determined based on a statistical analysis of said history information for each of the plurality of first time intervals in a predetermined number of preceding periods.

3. The server-load-balancing program according to claim 1, wherein said history information contains a maximum value of numbers of permanent connections required during each of said plurality of first time intervals in said at least one preceding period.

4. The server-load-balancing program according to claim 3, wherein said maximum value of the necessary numbers of permanent connections is a maximum value of a sum of the number of: at least one used permanent connection and the number of at least one processing request which waits for at least one permanent connection to become available during each of said plurality of first time intervals in said at least one preceding period.

5. The server-load-balancing program according to claim 3, wherein said optimum value in each of the plurality of second time intervals is an average of said maximum value of necessary numbers obtained in time intervals, corresponding to said each of the plurality of second time intervals, in a predetermined number of preceding periods.

6. A server-load-balancing method for establishing a permanent connection between a server-load-balancing apparatus and a server in advance, and requesting the server to execute a processing request received from a client, by using the permanent connection, comprising the steps of:
   (a) storing history information indicating conditions of use of at least one permanent connection in each of a plurality of first time intervals into which each of at least one preceding period is divided;

(b) determining an optimum value of the number of at least one permanent connection to be established in each of a plurality of second time intervals into which a coming period is divided, based on said history information, where the plurality of second time intervals correspond to the plurality of first time intervals, respectively; and (c) establishing between said server-load-balancing apparatus and said server said at least one permanent connection in each of said plurality of second time intervals in the coming period so that the number of the at least one permanent connection in each of the plurality of second time intervals is equal to said optimum value.

7. A server-load-balancing apparatus for establishing a permanent connection to a server in advance, and requesting the server to execute a processing request received from a client, by using the permanent connection, said server-load-balancing apparatus comprises:

a history storing unit which stores history information indicating conditions of use of at least one permanent connection in each of a plurality of first time intervals into which each of at least one preceding period is divided;

an optimum-number determination unit which determines an optimum value of the number of at least one permanent connection to be established in each of a plurality of second time intervals into which a coming period is divided, based on said history information, where the plurality of second time intervals correspond to the plurality of first time intervals, respectively; and a permanent-connection establishment unit which establishes between said server-load-balancing apparatus and said server said at least one permanent connection in each of said plurality of second time intervals in the coming period so that the number of the at least one permanent connection in each of the plurality of second time intervals is equal to said optimum value.

8. A computer-readable recording medium storing a server-load-balancing program which is executed by a computer and makes said computer perform a process for establishing a permanent connection between the computer and a server in advance, and requesting the server to execute a processing request received from a client, by using the permanent connection, said process comprises the steps of:

(a) storing history information indicating conditions of use of at least one permanent connection in each of a plurality of first time intervals into which each of at least one preceding period is divided;

(b) determining an optimum value of the number of at least one permanent connection to be established in each of a plurality of second time intervals into which a coming period is divided, based on said history information, where the plurality of second time intervals correspond to the plurality of first time intervals, respectively; and (c) establishing between said computer and said server said at least one permanent connection in each of said plurality of second time intervals in the coming period so that the number of the at least one permanent connection in each of the plurality of second time intervals is equal to said optimum value.

* * * * *

UNITED STATES PATENT AND TRADEMARK OFFICE
CERTIFICATE OF CORRECTION

| | |
|---|---|
| PATENT NO. | : 7,346,693 B2 |
| APPLICATION NO. | : 10/730675 |
| DATED | : March 18, 2008 |
| INVENTOR(S) | : Yuusuke Shimada |

It is certified that error appears in the above-identified patent and that said Letters Patent is hereby corrected as shown below:

<u>Title Page</u>:

Under Item [56] "U.S. Patent Documents", insert --2002/0120743 -08/2002-Shabtay et al.--.

<u>In the Claims</u>:

Col. 16, line 48, claim 4, delete "of: at" and insert --of at--.

Signed and Sealed this

Fourteenth Day of October, 2008

JON W. DUDAS
*Director of the United States Patent and Trademark Office*